United States Patent
Doss (10) Patent No.: US 6,415,263 B1
(45) Date of Patent: Jul. 2, 2002

(54) SYSTEM AND METHODS FOR DETERMINING AND DISPLAYING PRODUCT PRICING

(75) Inventor: Gary L. Doss, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/211,687

(22) Filed: Dec. 14, 1998

(51) Int. Cl.$^7$ .............................................. G06F 17/60
(52) U.S. Cl. ............................. 705/26; 705/16; 705/20; 707/10
(58) Field of Search ................................ 705/1, 16, 20, 705/26, 27; 707/10, 100

(56) References Cited

U.S. PATENT DOCUMENTS

| | | | |
|---|---|---|---|
| 5,542,078 A | * | 7/1996 | Martel et al. ................ 707/101 |
| 5,745,754 A | * | 4/1998 | Lagarde et al. ............. 707/102 |
| 5,897,622 A | * | 4/1999 | Blinn et al. .................... 705/26 |

FOREIGN PATENT DOCUMENTS

EP     1028376 A1  *  8/2000

OTHER PUBLICATIONS

"SourcingDirect.com"; Dairy Foods, Oct. 2000, vol. 101, No. 10, p. 10.*

* cited by examiner

Primary Examiner—Edward R. Cosimano
(74) Attorney, Agent, or Firm—Priest & Goldstein, PLLC (57) ABSTRACT

A system for determining and displaying product pricing for an item comprises a price checker object for gathering and assembling pricing information associated with the item. A store price object coupled to the price checker object provides an interface between the price checker object and an existing store database, and a price object coupled to the store price object holds data retrieved from the existing store database. A supplementary database coupled to the price checker object provides supplementary data associated with the item. Further, a formatter object coupled to the price checker object and the price object receives as an input the data contained in the price object and provides as an output a formatted output string.

14 Claims, 9 Drawing Sheets

SYSTEM AND METHODS FOR DETERMINING AND DISPLAYING PRODUCT PRICING

BACKGROUND OF THE INVENTION

1. Field of the Invention

The present invention relates generally to improvements to computerized in-store pricing systems, and more particularly to advantageous aspects of a system and methods for determining and displaying product pricing information.

2. Description of the Prior Art

The information provided in present store pricing systems is typically limited to a cost amount and, on occasion, descriptions for the cost of a single item. "Cost" is defined herein as the amount to be paid by a retail customer for specific individual items in a transaction. In typical prior art systems, the raw data for the generation of cost information is encapsulated in a pricing system database and its corresponding point-of-sale (POS) components. The cost of an individual item is derived from its price. "Price" is defined as the amount to be charged for an item, which includes data relating to the amount charged for the item and to the item's context in a transaction. For example, an item may cost 50 cents if purchased as a single unit, but less than 50 cents if a predetermined number of units is purchased. Thus, the price of an item may include more than one cost, depending upon the context, for example, "0.50 ea. or 3/$1.00." Existing pricing systems typically support only limited cost displays and are unable to display detailed pricing information.

There is thus a need for an in-store pricing system with the ability to generate a textual description of an item's price and other pricing information. Further, it is desirable for such a system to be able to work in conjunction with existing in-store pricing systems, generating detailed pricing information based upon the raw pricing data contained in the current in-store pricing system.

SUMMARY OF THE INVENTION

A presently preferred embodiment of the invention provides a system for determining and displaying product pricing for an item. The system comprises a software price checker object for gathering and assembling pricing information associated with a retail item. A store price object coupled to the price checker object provides an interface between the price checker object and an existing store database, and a price object coupled to the store price object holds data retrieved from the existing store database. A supplementary database coupled to the price checker object provides supplementary data associated with the retail item. Further, a formatter object coupled to the price checker object and the price object receives as an input the data contained in the price object and provides as an output a formatted output string.

Additional features and advantages of the present invention will become apparent by reference to the following detailed description and accompanying drawings.

DETAILED DESCRIPTION

One objective of the present invention is to provide access to detailed pricing information for a specific item from a store POS (point of service/sale) server system's price maintenance application, based upon raw pricing data contained in the store's existing pricing database and additional data contained in a supplementary database. The present embodiment of the invention is preferably Web-based. Thus, the present invention provides for formatting pricing information into a form suitable for display in a client Web browser.

The present invention may advantageously perform the following functions, based upon the input of a valid item identification code:

(1) Providing an interface to a store POS pricing system to obtain pricing information.
(2) Providing a full item description.
(3) Providing a description of the base price of the item.
(4) Providing an indication if the item is on sale.
(5) Providing a description of the sale price of an item or, alternatively, a description of a sale, or sales, that apply to the item.
(6) Providing a description of the manufacturer's suggested retail price (MSRP) of the item.
(7) Providing a description of the amount saved on the item, where applicable.
(8) Providing a description of the percentage saved on an item where applicable.
(9) Providing sale start and end dates.
(10) Collecting data on the operation of the present system.
(11) Issuing alerts for application events.
(12) Providing a list of all items on sale in the store or a specific department of the store.

Figure 1:
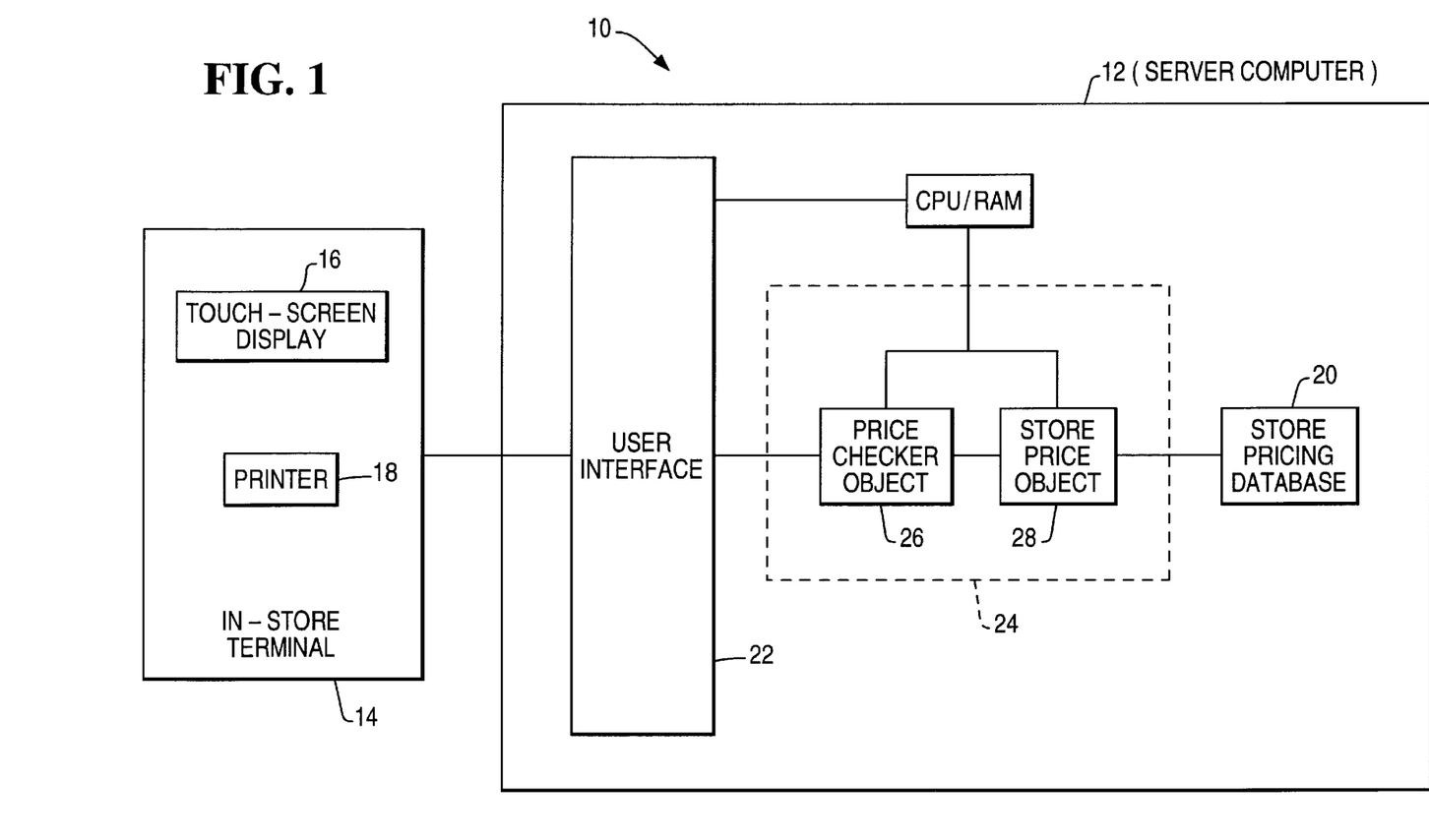
FIG. 1 is a diagram of a presently preferred embodiment of a system for determining and displaying pricing information according to the invention.

FIG. 1 shows a diagram of a presently preferred embodiment of a system 10 according to the present invention. As shown in FIG. 1, the system 10 comprises a server computer 12 that hosts a network of in-store terminals 14. The in-store terminals in the present embodiment may suitably comprise small-footprint PCs located throughout a retail establishment. Each in-store terminal 14 is provided with a touch-screen display 16 and printer 18 for receiving inputs from, and providing outputs to, a retail customer. Additional input and output devices may be added to the system, as desired. It would also be within the spirit of the invention for the system to work with off-site PCs that are connected into the network by the internet or other means of remote access, so that a potential customer or store employee could obtain product pricing information remotely.

The server computer 12 includes a store pricing database 20 containing raw pricing data, and a user interface 22. The store pricing database 20 and the user interface 22 are coupled to each other by two software component object model (COM) objects 24, which operate to perform the functions described in greater detail below. The two COM objects 24 include a price checker object 26 and a store price object 28. It is contemplated that the present invention can be practiced by installing the two COM objects 24 on a server computer 12 having an already existing store pricing database 20.

The price checker object 26 assembles and formats the desired pricing data. The store price object 28 provides an interface between the price checker object 26 and the store pricing database 20. Between these two objects are coupled other classes, objects, and customization dynamic link libraries (DLLs), described below, that provide the consolidation and manipulation of the store pricing data into a human readable format.

FIGS. 2A–2D show exemplary screenshots from an in-store terminal in a presently preferred embodiment of the invention. As discussed above, the in-store terminals 14 are provided with touch-screen displays 16, which provide a visual output to the customer in the form of text and graphics as well as accepting inputs from the customer through the application of pressure to designated areas of the display screen functioning as buttons. The system preferably provides a number of different standard display screens, each tailored to receive particular inputs from the customer, for example, identifying a product for which information is desired, and to provide particular outputs to the customer, including pricing and other product information, described below. The retail customer switches between display screens by pressing an appropriate screen button choice among a menu of choices.

Figure 2A:
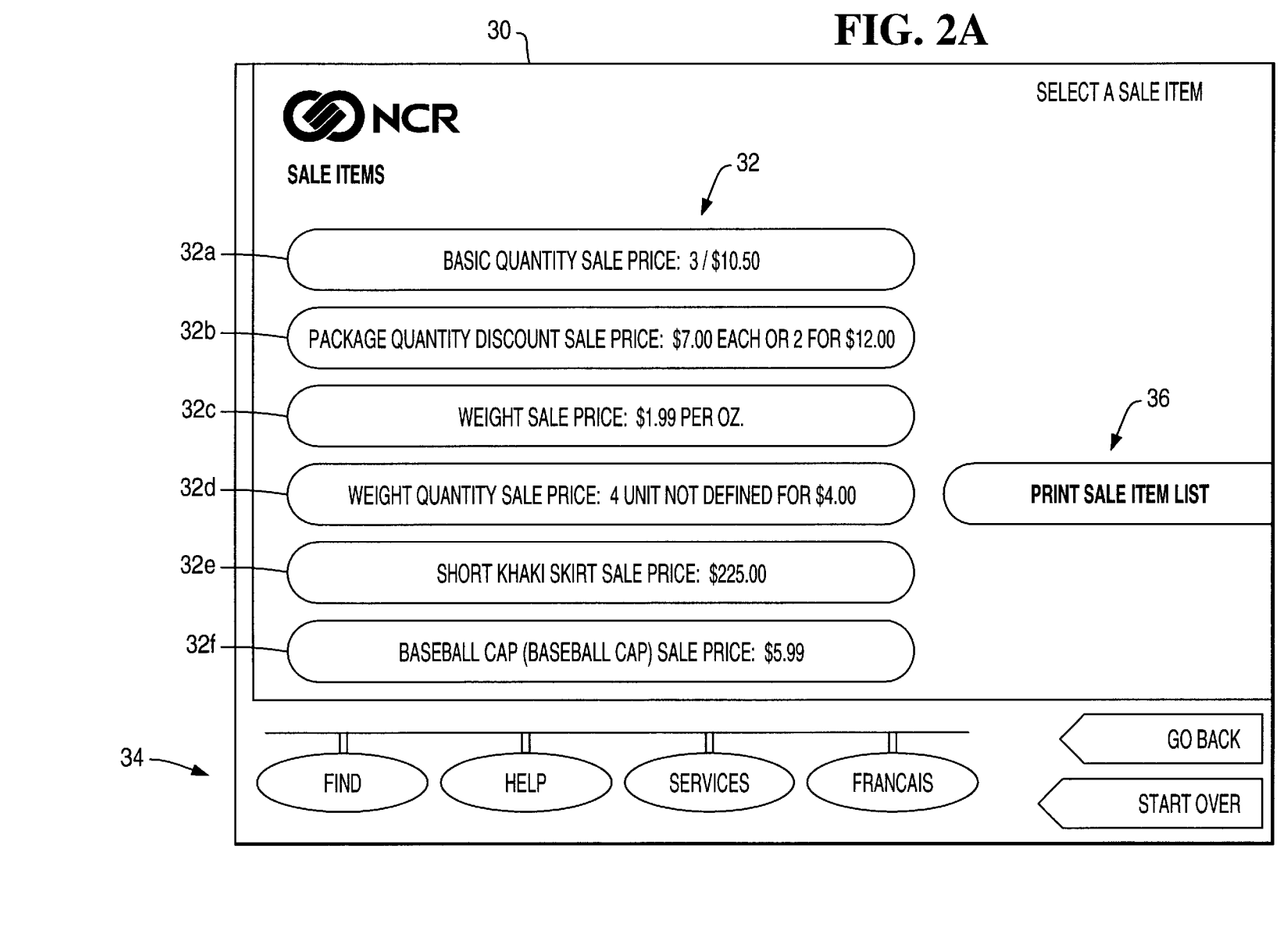
FIGS. 2A–2D are screenshots of a touch-screen display from an in-store terminal in accordance with a preferred embodiment of the present invention.

FIG. 2A shows a display screen 30 that lists sale items for a particular retail establishment. In this screen, each sale item is displayed on a menu of buttons 32 appearing on the left side of the screen. Thus, if a customer sees a button containing a sale item of interest, the customer can press that button to obtain additional information. The bottom region of the screen display 34 is dedicated to general system navigational buttons, which are used if the customer wishes general system or store information, or wishes to return to the previous screen or start over. The right side of each screen display 36 typically contains buttons that are specific to the screen currently being displayed. Here, as shown in FIG. 2A, there is a single button on the right side 34, which is pressed if the customer desires a printed list of sale items.

In addition, FIG. 2A shows various formats that price information may take. Button 32a shows the basic quantity sale price format, in which the price of an item is expressed as a number of items for sale at a given price, for example, "3/$10.50." Button 32b shows the package quantity discount sale price format, which expresses the price in the alternative, for example, "$7.00 each or 2 for $12.00." Button 32c shows the weight sale price format, which displays the price per unit weight, for example, "$1.99 per oz." Button 32d shows the weight quantity sale price format, which displays the price for a given weight quantity, for example, "4 pounds for $4.00." Finally, buttons 32e and 32f simply show items and their respective sale prices.

Figure 2B:
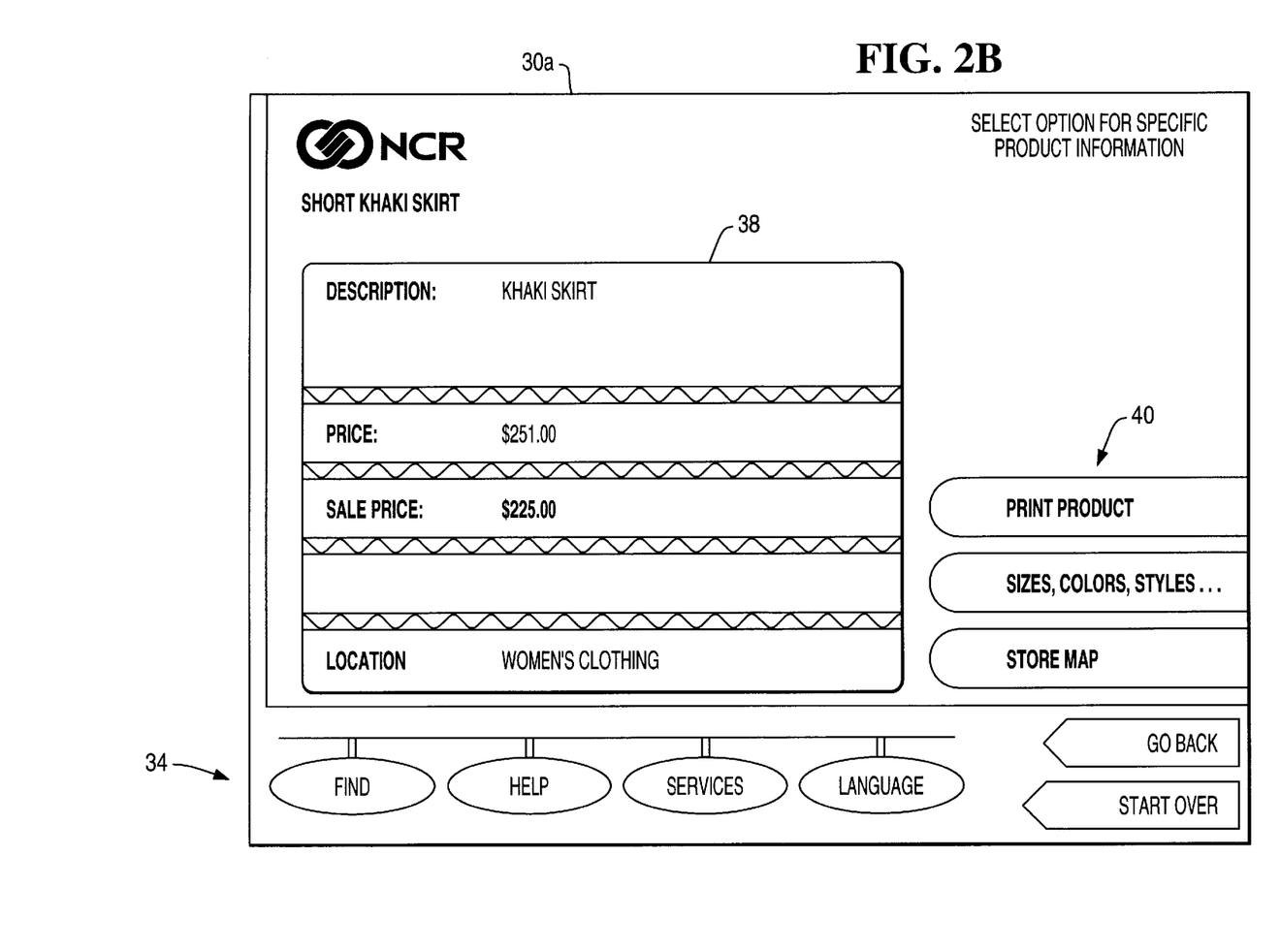

FIG. 2B shows the screen 30a that is called up if a retail customer presses the "short khaki skirt" button 32e appearing on the sale item screen of FIG. 2A. This screen 30a includes a box 38 showing a brief text description of the item, the normal price of the item, the sale price, as well as other information, such as product location. In addition, the buttons at the right side of the screen 40 allow the customer to print the information, obtain size, color and style information, as well as access a store map.

Figure 2C:
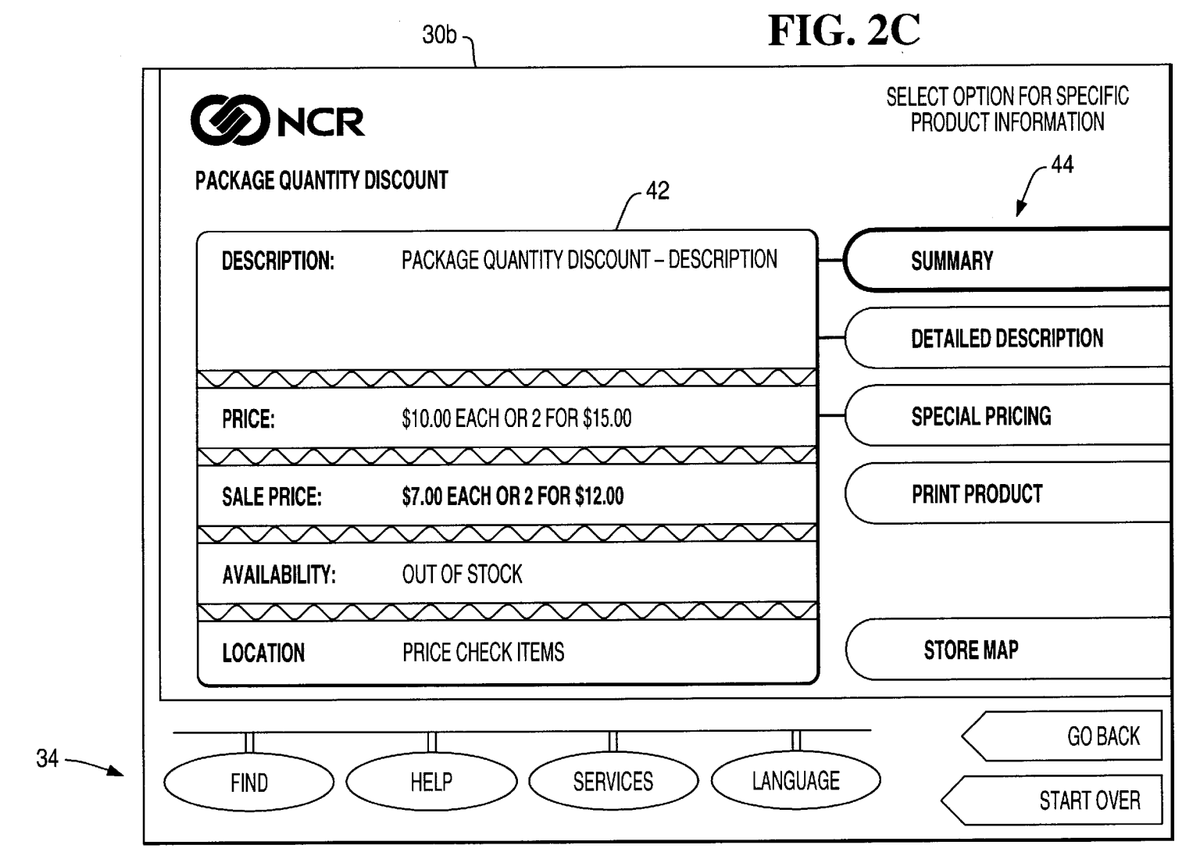

FIG. 2C shows the screen 30b that results if a retail customer presses the "package quantity discount" button 32b appearing on the sale item screen shown in FIG. 2A. This screen 30b includes a box 42 showing a brief text description of the item, the normal price of the item, the sale price of the item, the availability of the item, and the item's location. The buttons at the right side of the screen 44 provide additional options, including providing a detailed description and special pricing information, printing the product information, and accessing a store map.

Figure 2D:
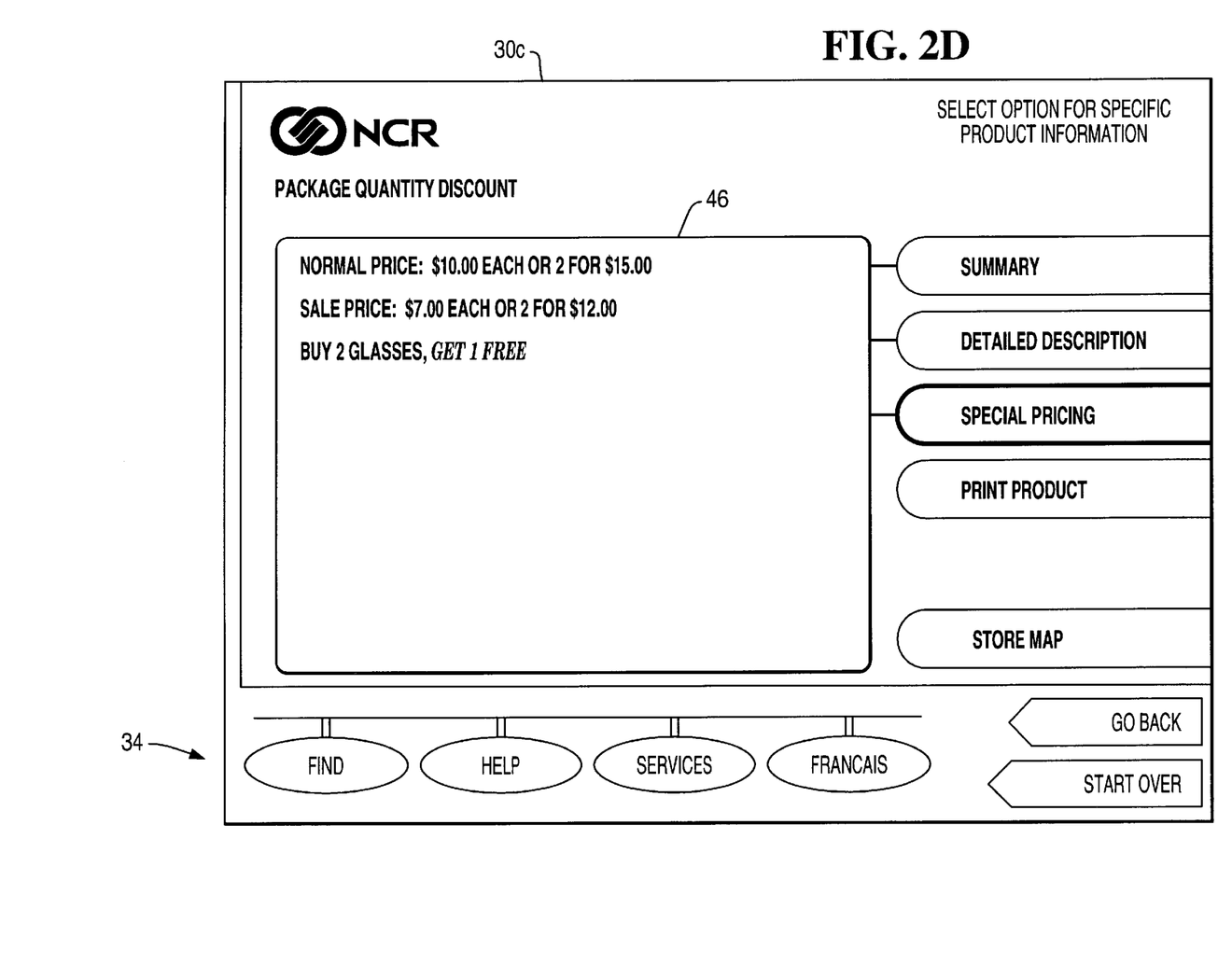

FIG. 2D shows the screen 30c that results if a retail customer presses the "special pricing" button appearing on the right side of the screen shown in FIG. 2C. This screen 30c includes a box 46 showing the normal price, the sale price, and the special offer "buy 2 glasses, get 1 free."

Thus, it can be seen from FIGS. 2A–2D and the above description that the present invention allows retail customers access to sophisticated pricing information and therefore represents a significant improvement over prior art that simply displays a product's price.

Figure 3:
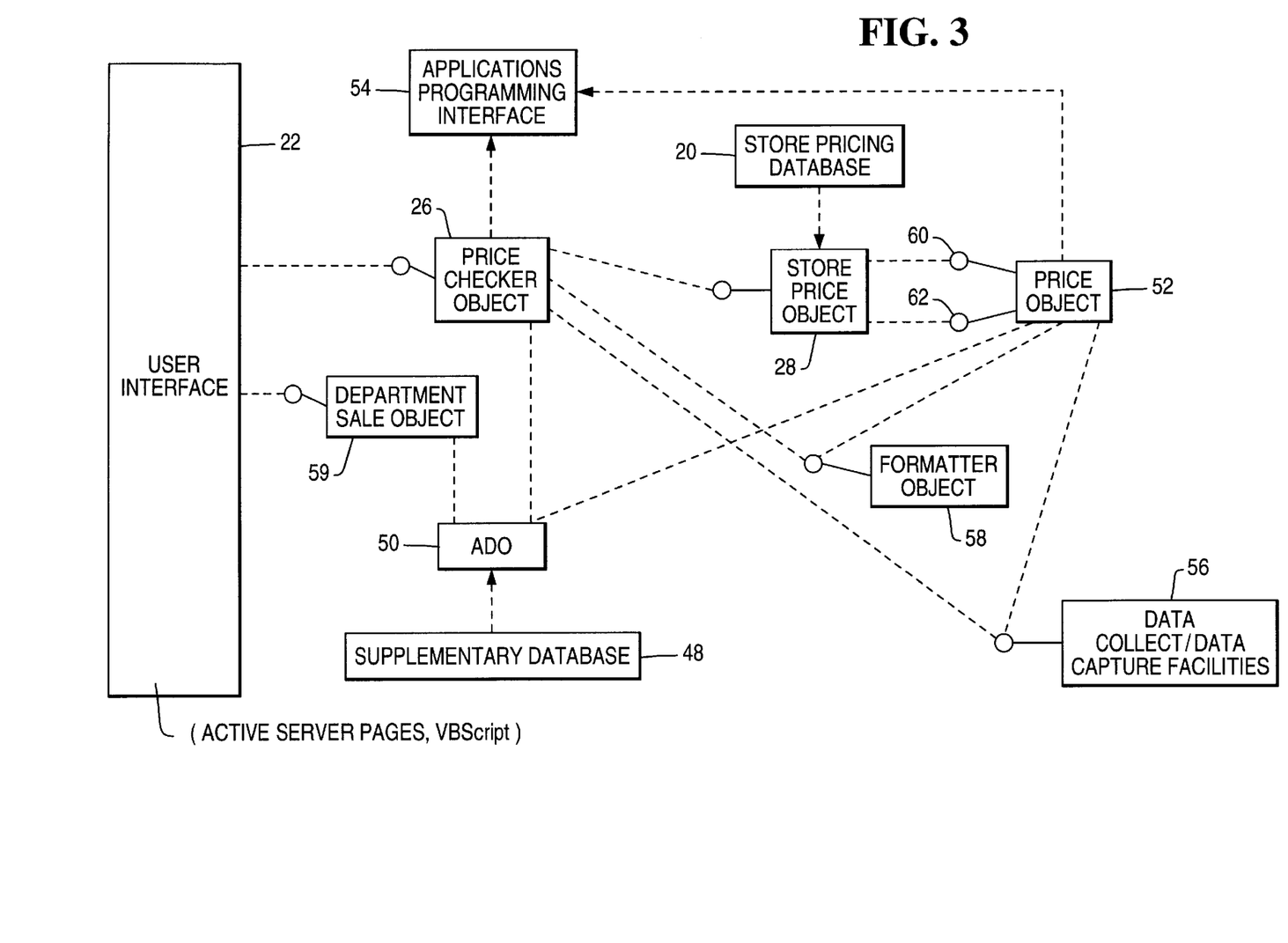
FIG. 3 is a diagram illustrating further details of the pricing system shown in FIG. 1.

FIG. 3 is a diagram showing the FIG. 1 embodiment of the invention in greater detail. As shown in FIG. 3, the system 10 further includes a supplementary database 48, separate from the existing store pricing database 20. The supplementary database 48 includes additional, more sophisticated pricing information that supplements the raw pricing data contained in the existing store pricing database 20. Thus, when information concerning a particular item is requested, relevant data is retrieved from both the existing store pricing database 20 and the supplementary database 48. The construction of the supplementary database 48 is performed as part of installation of the present product pricing system on top of an already existing in-store pricing system. In addition, the data in the supplementary database 48 can be updated as needed, or as part of routine system maintenance. In the present embodiment, the supplementary database 48 is preferably constructed using Microsoft SQL Server software, and an interface to the supplementary database 48 is provided utilizing Microsoft ActiveX Data Objects (ADO) 50.

Figure 4:
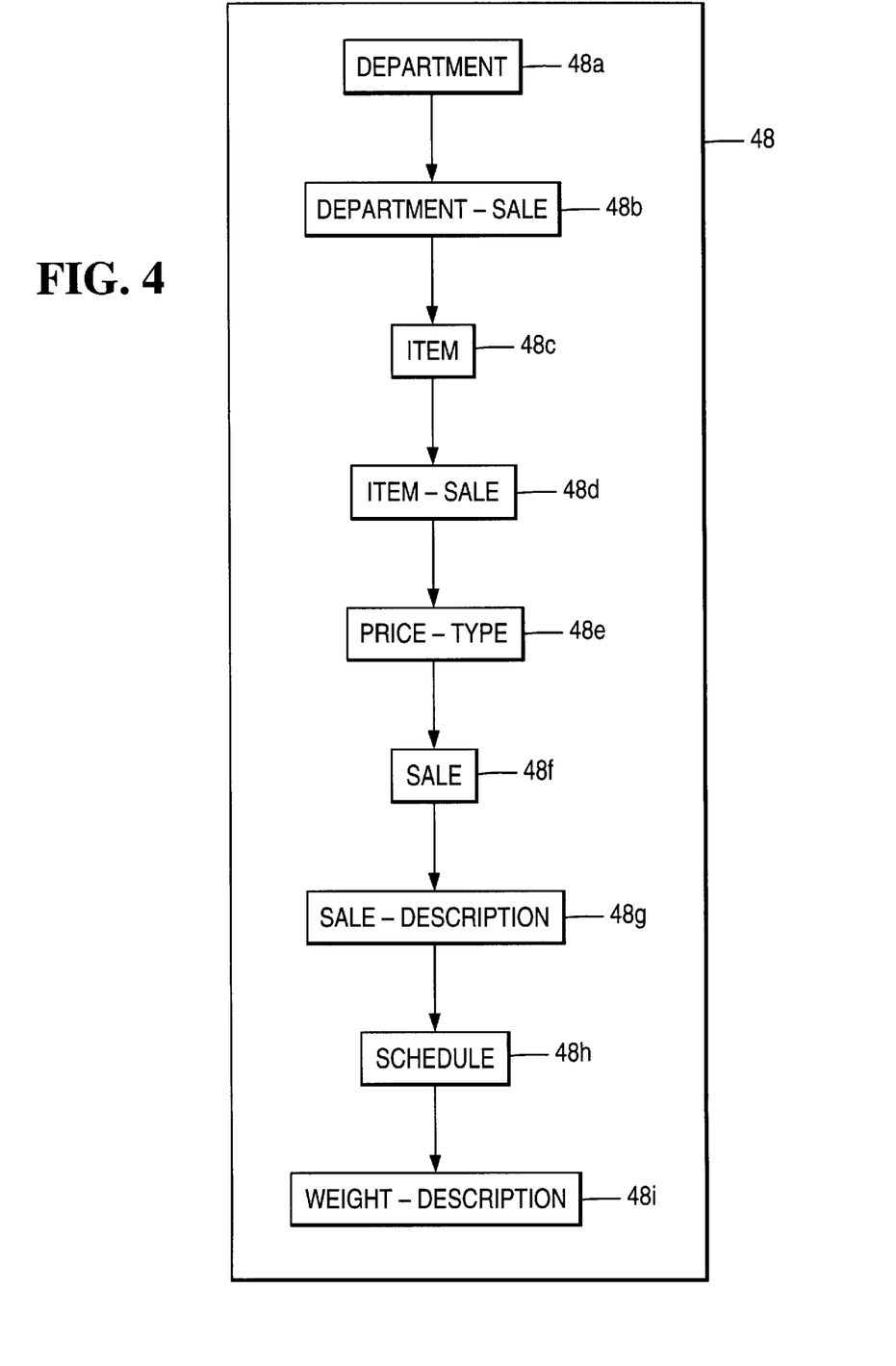
FIG. 4 is a diagram of a supplementary database according to a presently preferred embodiment of the invention.

FIG. 4 shows a diagram of the supplementary database 48 constructed according to the present embodiment of the invention. As shown in FIG. 4, the supplementary database 48 includes the following data model entities: DEPARTMENT 48a, DEPARTMENT-SALE 48b, ITEM 48c, ITEM-SALE 48d, PRICE-TYPE 48e, SALE 48f, SALE-DESCRIPTION 48g, SCHEDULE 48h, and WEIGHT-DESCRIPTION 48i. It will be recognized that other data model entities may suitably be employed.

The DEPARTMENT entity 48a defines the retailer's existing department structure. The presently preferred pricing system uses the department-id and parent-department-id attributes of this entity.

The DEPARTMENT-SALE entity 48b defines a department-wide sale by associating a sale with a department. The system uses the department-id and sale-id attributes of this entity.

The ITEM table 48c is used to associate a retailer's existing item identifiers to the information stored in the supplementary database. The present pricing system uses the item-id and department-id attributes of this entity.

The ITEM-SALE entity 48d defines an item sale by associating a sale with an item. The system uses the item-id and sale-id attributes of this entity.

The PRICE-TYPE entity 48e contains the definition of the price types used by the present invention. It contains a price type value and two boolean fields has_deal_desc and has_limit_desc to indicate the availability of deal and limit descriptions. In the present embodiment, it is assumed that the existence of a price type means that a basic description is always available.

The SALE entity 48f defines a sale in the supplementary database. The system uses the sale-id, sale-type, and schedule-id attributes of this entity.

The SALE-DESCRIPTION entity 48g provides detailed descriptions for sales defined in the supplementary database. The system uses the sale-id, language-id, and sale-description attributes of this entity.

The SCHEDULE entity 48h defines a schedule time frame that is associated with the SALE entity 36f through the attribute schedule-id. The system uses the schedule-id, schedule-start-date, schedule-start-time, schedule-end-date, schedule-end-time, and schedule-type attributes of the SCHEDULE entity 48h.

The WEIGHT-DESCRIPTION 48i entity contains the abbreviations to be used to describe the unit weights in weight-based prices. The system uses the weight-id, language-id, and weight-description attributes of this entity.

Returning to FIG. 3, the user interface 22 preferably is implemented using Microsoft Active Server Pages with VBScript. An Active Server Page is a hypertext markup language (HTML) page that includes one or more scripts (i.e., embedded programs) that are processed on a Microsoft Web server before the page is sent to the user. Thus, the script in the Web page at the server uses input received as the result of the user's request for the page to access pricing data from the existing store pricing database and then build and format the page before sending it to the requester.

When a user identifies an item at an in-store terminal, the ASP script of the user interface creates the price checker object 26, a software object that provides coordination, management, and manipulation of the pricing data. The price checker object 26 gathers all of the required pricing data from the existing store pricing system 20 and the supplementary database 48 and creates a price object 52 to contain and further manipulate the data gathered from the existing store pricing system 20. The price checker object 26 also logs application events to an applications programming interface (API) 54, for example, NCR Store Minder. The price checker object then uses the system's Data Collect/Data Capture facilities 56 to write trace data (i.e., system data that is collected in order to analyze software performance).

In order to gather the raw pricing data associated with the inputted retail item identification, the price checker object 26 creates store price object 28, which provides an interface to the existing store pricing system 20. The price checker object 26 also creates a formatter object 58 to handle the formatting of the item data.

The user interface ASP script submits a request to the price checker object 26 to look up data corresponding to a specific retail item. The price checker object 26 passes the request to the store price object 28, which gathers price and sales information about the item from the existing store pricing database 20. The price checker object 26 also gathers item data from the supplementary database 48.

The ASP script then requests a formatted pricing string from the price checker object 26. The price checker object 26 passes the request to formatter object 58 along with price object 52. The price checker object 26 returns the formatted string to the ASP script. Finally, the ASP script releases the price checker object 26. The price checker object releases store price object 28, which in turn releases any price objects 52.

As shown in FIG. 3, the presently preferred embodiment of the invention further provides a department sale object 59 for accessing a list of items on sale. The department sale object 59 provides an interface to a list of sale items and department sales. It gathers information from the supplementary database 48 through the use of the ADO interfaces 50. The department sale object 59 also logs application events to the API 54 and uses the system data collection facilities 56 to write trace data.

When department sale information is requested, the department sale object 59 is created by the ASP script. The ASP script then passes a request to the department sale object 59 to look up data for a specific department. The department sale object 59 extracts sale data from the supplementary database 48 and creates collection interfaces as appropriate. The ASP script passes requests to the collection interfaces from the department sale object 59 and uses the collection interfaces to display sale item data to the consumer. The ASP script then releases the department sale object 59, which in turn releases the collection objects.

In the presently preferred embodiment, a common price record format is defined that supports the sharing of information between the pricing system and other software. This common price record format not only includes the raw pricing data, but also includes an indication of the context for the data in a transaction. This common price record format is implemented in price object 52, which supports both a single record price interface 60 and a price collection or multi-record price interface 62. Formatter object 58 takes the common price record format in the price object 52 and produces a formatted pricing string. The present invention further provides a set of price types, developed through examination of existing pricing systems, that define specific transaction contexts. Examples of these price types are discussed above, in connection with FIG. 2A. Formatting strings (i.e., templates) that allow the insertion of the raw pricing data describe each of these price types or contexts.

In the present embodiment, each price type or context can have up to three descriptions: basic, deal, and limit. The "basic" description provides the basis for the price. The "deal" description provides transactional context for the price. The "limit" description provides transactional limits on the price. These formatting strings are stored in a database that is compliant with Microsoft's Open Database Connectivity (ODBC) standard.

The store price object 28 is a COM object providing a translation interface that allows the existing store price data to be made available in the common price record format. Examination of existing systems have shown that there are four primary categories of price: Normal, Sale, Loyalty, and Manufacturer. The Normal price is the price normally charged when an item is not on sale. The Sale price is the price charged during a sale. The Loyalty price is the price charged to a customer who is a member of a loyalty or customer rewards program. The Manufacturer's price is the manufacturer's suggested retail price (MSRP) for the item. In the presently preferred embodiment of the invention, the store price object only supplies prices for those categories that are supported in the existing store pricing data.

The price checker COM object 26 uses the common price records and format strings to produce a consistent price description. Specifically, the price checker object 26 uses store price object 28 to retrieve pricing data for an item in the format specified in the single record price interface 60 and the price collection or multi-record price interface 62. It provides access to the format strings, which have been expanded to include the actual pricing data as translated by the store price object 28 from the raw pricing data for each of the price categories.

The use of COM interfaces ensures that, regardless of the implementation, the access to the price record data and context information is consistent across all applications. By maintaining the context information with the raw pricing data, the price records can be used in a consistent manner by other applications (for example, inventory, accounting, and other managerial software) that need access to pricing data. This allows the pricing system to continue to calculate individual item cost while a secondary system can provide a context-based description of the item's price. In essence, it advantageously allows larger, more complex systems to be built onto the existing data. This also allows the pricing data to be used in a proactive manner to display the item's price to a consumer before the actual purchase of the item. This in turn allows the consumer to make a more educated value decision about the purchase of an item.

Figure 5:
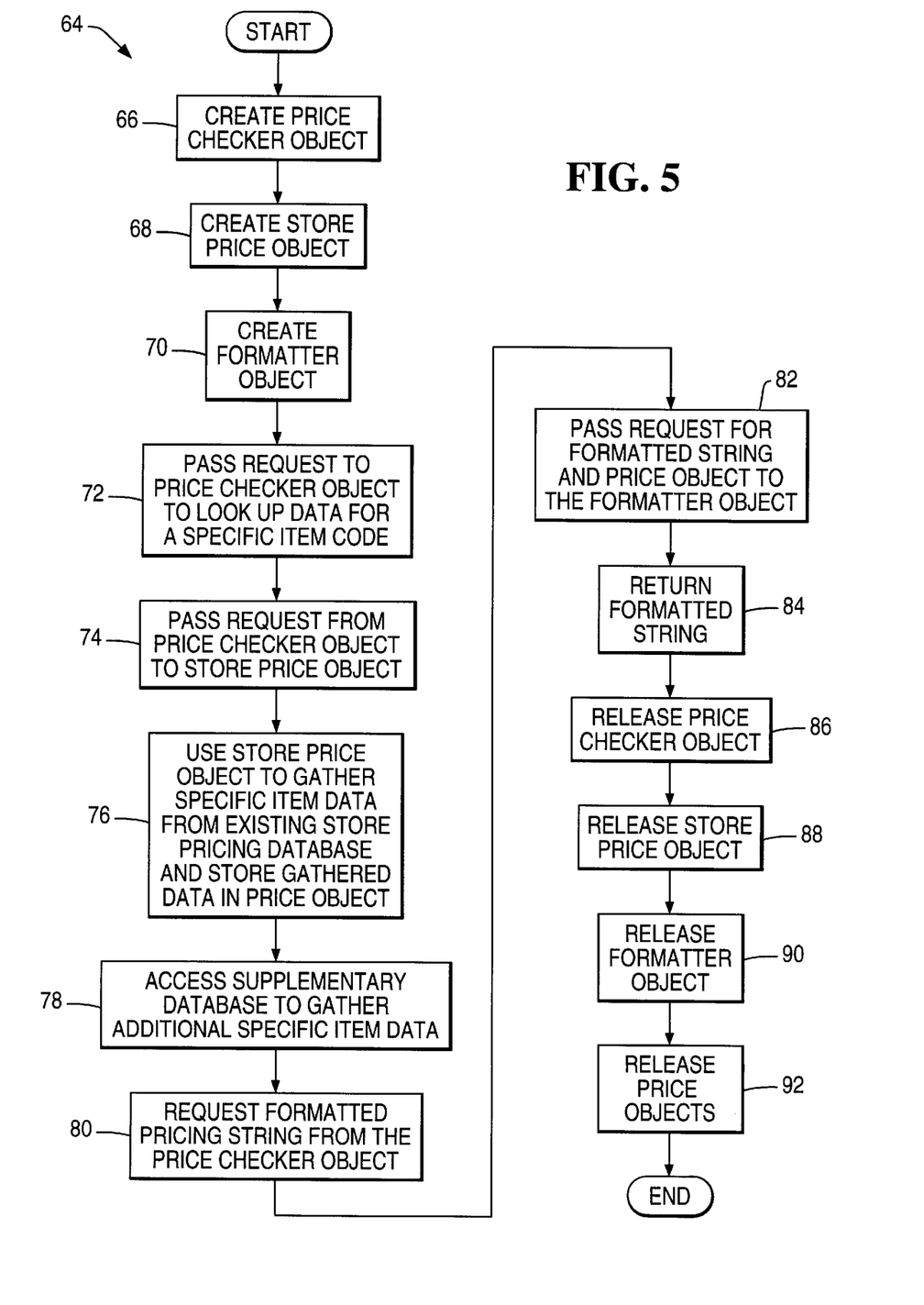
FIG. 5 is a flowchart of a method for assembling and displaying pricing information according to a presently preferred embodiment of the invention.

FIG. 5 shows a presently preferred embodiment of a method 64 according to the present invention. In the first step 66, a price checker object is created. As discussed above, this can be accomplished by a user interface using Active Server Pages with VBScript. The price checker object then gathers the requested pricing information. In the second step 68, a store price object is created. As discussed above, the store price object provides an interface between the price checker object and an already existing store database. In the next step 70, a formatter object is created. The formatter object formats data gathered by the price checker object.

After the price checker, store price, and formatter objects have been created, a request for information relating to a specific retail item is passed to the price checker object in step 72. In step 74, the request is passed from the price checker object to the store price object. In step 76, the store price object gathers specific item data from the existing store pricing database, and the gathered data is stored in a price object created by the price checker object. Further, in step 78 a supplementary database is accessed to gather additional specific item data.

In step 80, once the desired information has been assembled and placed into the price object, a formatted pricing string is requested from the price checker object. The request for a formatted string and the price object are passed to the formatter object in step 82. In step 84, the formatter object returns a formatted string, which is provided as an output to the user. Finally, in steps 86 through 92, the price checker, store price, formatter, and price objects are released.

Figure 6:
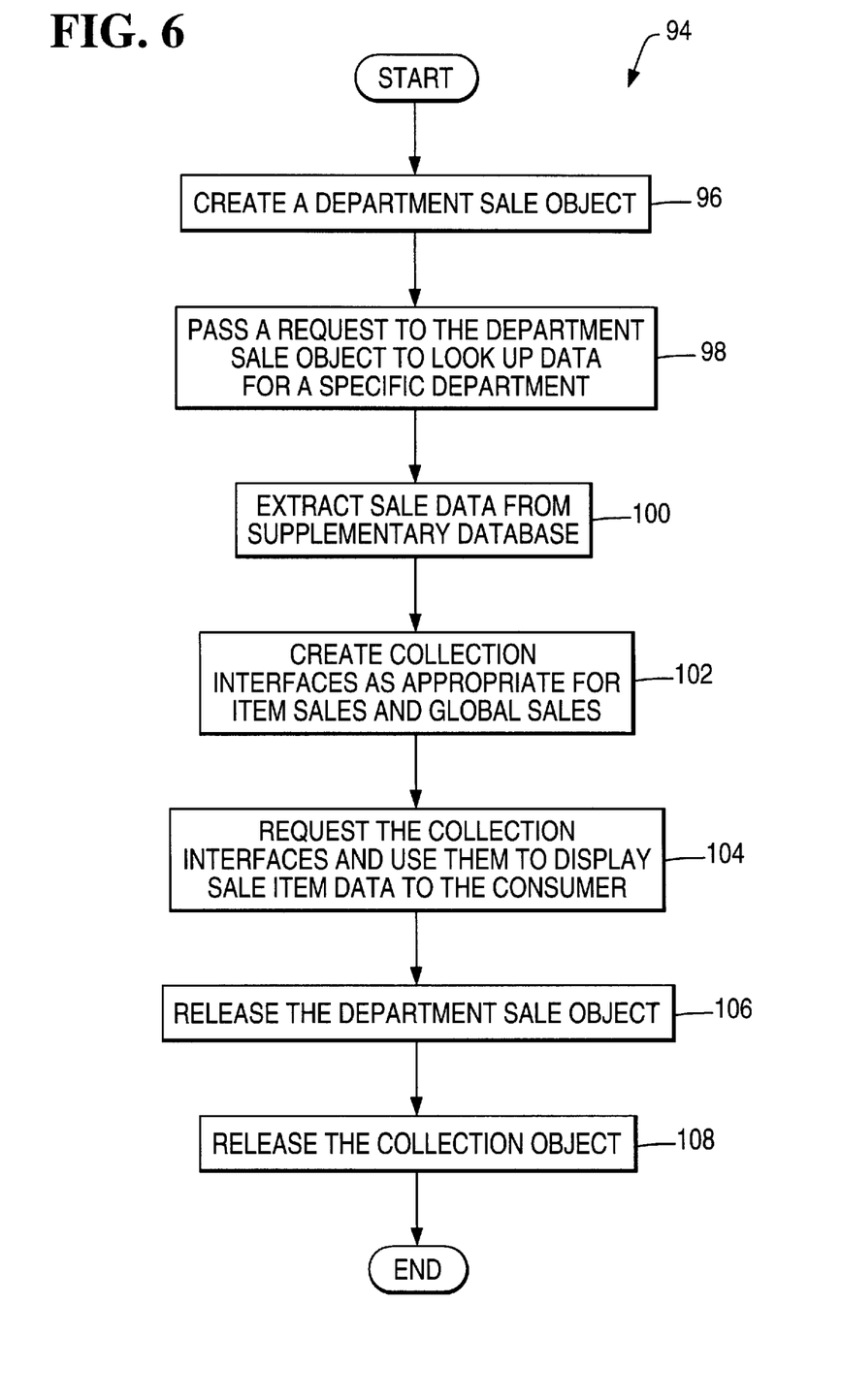
FIG. 6 is a flowchart of a method for assembling and displaying department sale information according to a presently preferred embodiment of the invention.

FIG. 6 shows a method for obtaining department sale information 94 in accordance with a presently preferred embodiment of the invention. In the first step 96, a department sale object is created for providing an interface to a list of sale items and department sales. After the department sale object has been created, in step 98, a request is passed to it to look up data for a specific department. In step 100, the sale data is then extracted from a supplementary database. Collection interfaces are created in step 102, as appropriate, for item sales and global sales. In step 104, a request is then passed to the collection interfaces, which are used to display sale item data to the user. Finally, in steps 106 and 108, the department sale and collection objects are released.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A system for determining and displaying product pricing for an item, comprising:

a price checker object for gathering and assembling pricing information associated with the item;

a store price object coupled to the price checker object for providing an interface between the price checker object and an existing store database;

a price object coupled to the store price object for holding data retrieved from the existing store database;

a supplementary database coupled to the price checker object for providing supplementary data associated with the item;

a formatter object coupled to the price checker object and the price object for receiving as an input the data contained in the price object and providing as an output a formatted output string including product pricing; and displaying the formatted output string.

2. The system of claim 1, wherein the price checker object and the store price object comprise Component Object Models.

3. The system of claim 1, wherein the system further comprises an applications programming interface coupled to the price checker object, and wherein the price checker object logs events to the applications programming interface.

4. The system of claim 1, wherein the system further comprises data collect/data capture facilities, and wherein the price checker uses the data collect/data capture facilities to write trace data.

5. The system of claim 1, wherein the store price interface provides a translation interface that allows the existing store price data to be made available in a common price record format.

6. The system of claim 5, wherein the price checker object uses the store price object to retrieve pricing data for an item in a specified format.

7. The system of claim 1 further comprising a department sale object, coupled to the user interface and the supplementary database, for looking up sale information for a specific department.

8. The system of claim 7, wherein the department sale object creates collection interfaces to collect and display sale information.

9. The system of claim 1, further comprising:

a user interface, coupled to the price checker object, for receiving inputs from and providing outputs to a user.

10. The system of claim 9, wherein the system is Web-based, and wherein the user interface comprises active server pages with scripts.

11. The system of claim 10, wherein the price object is created by a script in the active server pages.

12. A method for assembling and formatting pricing information for an item, comprising the following steps:

(a) creating a price checker object for gathering and assembling pricing information;

(b) creating a store price object for providing an interface between the price checker object and an existing store pricing database;

(c) creating a formatter object for formatting pricing information;

(d) passing a request to the price checker object to look up data for the item;

(e) passing the request from the price checker object to the store price object;

(f) using the store price object to gather specific item data from the existing store database and storing the gathered data in a price object;

(g) accessing a supplementary database to gather additional specific item data;

(h) passing a request for a formatted string and the price object to the formatter object;

(i) returning the formatted string as an output; and (j) releasing the price checker, store price, formatter, and price objects.

13. The method of claim 12, further comprising the following substeps performed before step (a):

(1) providing a user interface coupled to the price checker object;

(2) providing as an input to the user interface an item for which pricing information is desired.

14. A method for assembling and displaying department sale information, comprising the following steps:

(a) creating a department sale object;

(b) passing a request to the department sale object to look up data for a specific department;

(c) extracting sale data from a supplementary database;

(d) creating collection interfaces coupled to the department sale object;

(e) passing a request to the collection interfaces and using them to display sale item data; and (f) releasing the department sale and collection objects.

\* \* \* \* \*